(12) United States Patent
McElhone et al.

(10) Patent No.: US 11,064,282 B1
(45) Date of Patent: Jul. 13, 2021

(54) WEARABLE AUDIO SYSTEM USE POSITION DETECTION

(71) Applicant: Bose Corporation, Framingham, MA (US)

(72) Inventors: Dale McElhone, Marlborough, MA (US); Binu Oommen, Franklin, MA (US); Cory Roberts, Mendon, MA (US); Mehul Trivedi, Oakland, CA (US); Kyle A. Vecchiarino, Cranston, RI (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/857,462

(22) Filed: Apr. 24, 2020

(51) Int. Cl.
*H04R 1/10* (2006.01)

(52) U.S. Cl.
CPC .................................. *H04R 1/1041* (2013.01)

(58) Field of Classification Search
CPC ..................................................... H04R 1/1041
See application file for complete search history.

(56) References Cited

U.S. PATENT DOCUMENTS

| | | | |
|---|---|---|---|
| 10,397,681 B2 | 8/2019 | Silver et al. | |
| 2009/0296044 A1* | 12/2009 | Howell | G02C 5/143 351/158 |
| 2019/0394564 A1* | 12/2019 | Mehra | H04S 7/30 |
| 2020/0327877 A1* | 10/2020 | Tourbabin | H04R 3/002 |
| 2020/0336856 A1* | 10/2020 | Khaleghimeybodi | H04S 7/301 |
| 2021/0034725 A1* | 2/2021 | Donley | G06F 21/32 |

\* cited by examiner

*Primary Examiner* — Simon King
(74) *Attorney, Agent, or Firm* — Brian M. Dingman; Dingman IP Law, PC

(57) ABSTRACT

A wearable audio system with a first active portion that in its normal use position is carried on a user's body on a first side of the mid-sagittal plane and a second active portion that in its normal use position is carried on the user's body on a second side of the mid-sagittal plane. Sound is transmitted from one active portion and received at the other active portion. The received sound is used to estimate whether the active positions are in their use positions.

20 Claims, 2 Drawing Sheets

WEARABLE AUDIO SYSTEM USE POSITION DETECTION

BACKGROUND

This disclosure relates to detecting when wearable audio devices are in a proper use position.

Wearable audio devices that are part of a wearable audio system are carried on the head, torso, or shoulders of a user. Wearable audio devices should begin full operation when they are put in their proper use position.

SUMMARY

All examples and features mentioned below can be combined in any technically possible way.

In one aspect, a method includes transmitting sound from a first active portion of a wearable audio system, receiving the transmitted sound at a second active portion of a wearable audio system, and estimating from the received sound whether the first active portion of a wearable audio system is in a use position carried on a user's body on a first side of the mid-sagittal plane and the second active portion of the wearable audio system is in a use position carried on the user's body on a second side of the mid-sagittal plane.

Some examples include one of the above and/or below features, or any combination thereof. In an example a proximity sensor is used to determine if the first and second active portions of the wearable audio system are in the use position. In an example an orientation sensor is used to determine if the first and second active portions of the wearable audio system are in the use position. In some examples the first and second active portions of the wearable audio system are open audio devices. In some examples the first and second active portions of the wearable audio system each comprise an off-ear headphone that comprises an audio driver that is configured to output sound proximate but not in an ear of the user. In an example the first active portion of the wearable audio system is part of a first temple piece of eyeglass headphones and the second active portion of the wearable audio system is part of a second temple piece of the eyeglass headphones. In an example the first and second active portions of the wearable audio system each comprise an audio driver and a microphone. In an example the first active portion of the wearable audio system comprises an audio driver and the second active portion of the wearable audio system comprises a microphone.

Some examples include one of the above and/or below features, or any combination thereof. In some examples estimating from the received sound whether the first active portion of the wearable audio system is in a use position carried on a user's body on a first side of the mid-sagittal plane and the second active portion of the wearable audio system is in a use position carried on the user's body on a second side of the mid-sagittal plane comprises detecting whether the transmitted sound was received at the second active portion of the wearable audio system. In an example estimating from the received sound whether the first active portion of the wearable audio system is in a use position carried on a user's body on a first side of the mid-sagittal plane and the second active portion of the wearable audio system is in a use position carried on the user's body on a second side of the mid-sagittal plane further comprises determining a level of the received sound. In an example determining a level of the received sound comprises determining whether the level of received sound is less than a threshold level. In an example the threshold level comprises a level of received sound when neither of the first and second active portions of the wearable audio system are in the use position. In an example determining a relative level of the received sound comprises determining an acoustic transfer function between an audio driver of the first active portion of the wearable audio system and a microphone of the second active portion of the wearable audio system. In an example a level of the transfer function is determined for at least one frequency above a threshold frequency. In an example the threshold frequency is 1 kHz.

Some examples include one of the above and/or below features, or any combination thereof. In an example estimating from the received sound whether the first active portion of the wearable audio system is in a use position carried on a user's body on a first side of the mid-sagittal plane and the second active portion of the wearable audio system is in a use position carried on the user's body on a second side of the mid-sagittal plane comprises comparing a level of the received sound to a threshold level determined when neither of the first and second active portions of the wearable audio system are in the use position. In some examples the transmitted sound is in an ultrasonic range. In an example estimating from the received sound whether the first active portion of the wearable audio system is in a use position carried on a user's body on a first side of the mid-sagittal plane and the second active portion of the wearable audio system is in a use position carried on the user's body on a second side of the mid-sagittal plane comprises performing discrete Fourier transforms on received ultrasonic sounds.

In another aspect a method includes transmitting sound from a first temple piece of eyeglass headphones, wherein the first temple piece comprises an audio driver that is configured to output sound proximate but not in an ear of the user, receiving the transmitted sound at a microphone of a second temple piece of the eyeglass headphones, wherein the second temple piece comprises an audio driver that is configured to output sound proximate but not in an ear of the user and a microphone, detecting whether the transmitted sound was received at the microphone, and determining a level of the received sound, to determine whether the eyeglass headphones are in a use position with the first temple piece proximate a first ear of the user and the second temple piece proximate a second ear of the user.

In another aspect a wearable audio device includes a first off-ear headphone that comprises a first audio driver that is configured to output sound proximate but not in a first ear of a user, and a second off-ear headphone that comprises a second audio driver that is configured to output sound proximate but not in a second ear of the user, and a microphone having an output. A processor is configured to estimate from the microphone output whether the first off-ear headphone is in a use position proximate or on the first ear of the user and the second off-ear headphone is in a use position proximate or on the second ear of the user.

Some examples include one of the above and/or below features, or any combination thereof. In an example estimating from the microphone output whether the first off-ear headphone is in a use position proximate or on the first ear of the user and the second off-ear headphone is in a use position proximate or on the second ear of the user comprises comparing a level of the microphone output to a threshold level determined when neither of the first and second off-ear headphones are in the use position. In an example the first off-ear headphone is part of a first temple piece of eyeglass headphones and the second off-ear headphone is part of a second temple piece of the eyeglass headphones.

DETAILED DESCRIPTION

Figure 1:
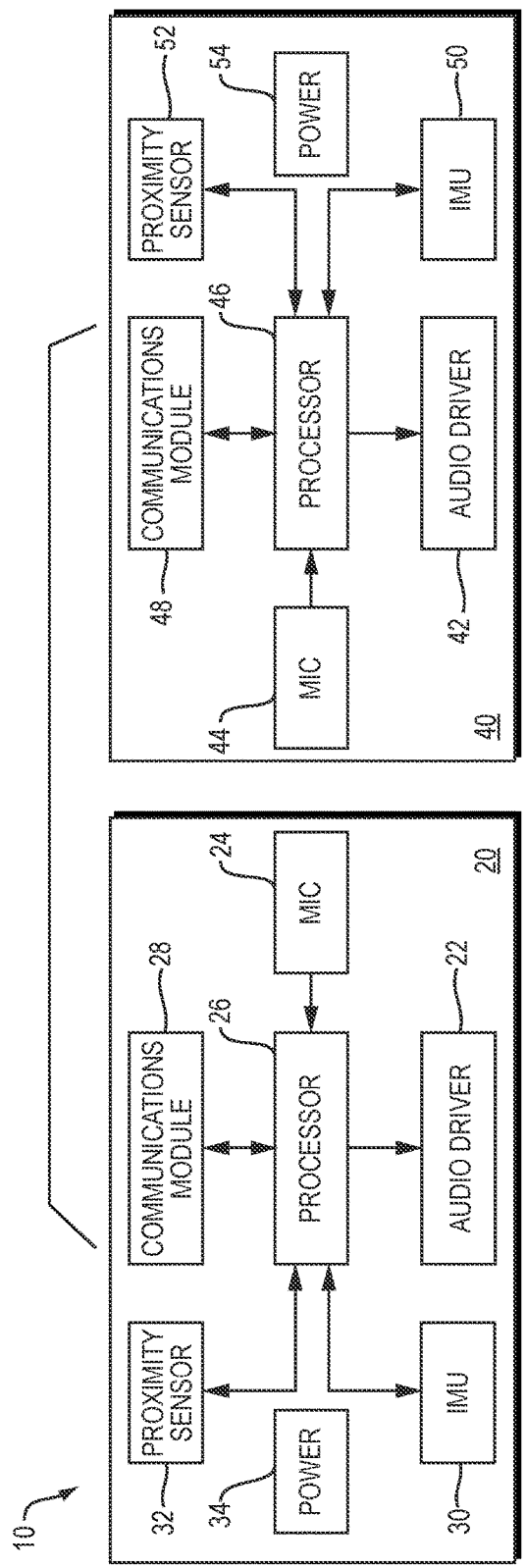
FIG. 1 is schematic diagram of a wearable audio system that includes use position detection.

In examples described herein a wearable audio system includes two active portions. In the proper use position one active portion is on one side of the mid-sagittal plane and the second active portion is on the other side of the mid-sagittal plane. In an example the active portions are both open audio devices. In an example the first open audio device includes a first off-ear headphone that comprises an audio driver that is configured to output sound proximate but not in a first ear of the user, and the second open audio device includes a second off-ear headphone that comprises a microphone and an audio driver that is configured to output sound proximate but not in a second ear of the user. In an example a processor is used to estimate from the microphone output whether the off-ear headphones are in their use positions, with one proximate or on one ear of the user and the other proximate or on the other ear of the user.

Such a wearable audio system, or other wearable audio devices, can be used to accomplish a method for detecting whether the active portions of the wearable audio system are in their proper use positions. In an example of the method, sound is transmitted from one active portion and is received at the other active portion. The method involves estimating from the received sound whether the active portions are in their use positions, with one of them carried on a user's body on one side of the mid-sagittal plane and the other one also carried on the user's body but on the other side of the mid-sagittal plane. This estimation can be based on detecting whether the transmitted sound was received at the receiving active portion, and determining the level of the received sound. The level of the received sound can be compared to a threshold level. In an example the threshold level is the level of the received sound when neither of the active portions are in their use positions. When the active portions are carried on opposite sides of the head, the level of sound transmitted from a driver on one side of the head and received by a microphone on the other side of the head will, at least at higher frequencies, be less than a threshold level that is determined when the active portions are off the head and spaced apart by about the same distance as when they are on the head. This is because the head effectively attenuates frequencies greater than about 1000 Hz.

Some examples of this disclosure describe a type of wearable audio device that is known as an open audio device. Open audio devices have one or more electro-acoustic transducers (i.e., audio drivers) that are located off of the ear canal opening. In some examples the open audio devices also include one or more microphones; the microphones can be used to pick up the user's voice and/or for noise cancellation. Open audio devices are further described in U.S. Pat. No. 10,397,681, the entire disclosure of which is incorporated herein by reference for all purposes.

A headphone refers to a device that typically fits around, on, or in an ear and that radiates acoustic energy into the ear canal. Headphones are sometimes referred to as earphones, earpieces, headsets, earbuds, or sport headphones, and can be wired or wireless. A headphone includes an electro-acoustic transducer (driver) to transduce electrical audio signals to acoustic energy. The acoustic driver may or may not be housed in an earcup. A headphone may be a single stand-alone unit or one of a pair of headphones (each including at least one acoustic driver), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality, such as a microphone.

In an around the ear or on the ear or off the ear headphone, the headphone may include a headband or other support structure and at least one housing or other structure that contains a transducer and is arranged to sit on or over or proximate an ear of the user. The headband can be collapsible or foldable, and can be made of multiple parts. Some headbands include a slider, which may be positioned internal to the headband, that provides for any desired translation of the housing. Some headphones include a yoke pivotably mounted to the headband, with the housing pivotally mounted to the yoke, to provide for any desired rotation of the housing.

An open audio device includes but is not limited to an off-ear headphone, i.e., a device that has one or more electro-acoustic transducers that are coupled to the head or ear (typically by a support structure) but do not occlude the ear canal opening. In the description that follows the open audio device is depicted as an off-ear headphone comprising audio eyeglasses, but that is not a limitation of the disclosure as the electro-acoustic transducer and the receiving microphone can be used in any device that is configured to deliver sound to one or both ears of the wearer where there are typically no ear cups and no ear buds. The wearable audio systems contemplated herein may include a variety of devices that include an over-the-ear hook, such as a wireless headset, hearing aid, eyeglasses, a protective hard hat, and other open ear audio devices.

One or more of the systems and methods described herein, in various examples and combinations, may be used in a wide variety of wearable audio systems, including wearable audio devices in various form factors. Unless specified otherwise, the term active portion of a wearable audio system, as used in this document, includes headphones and various other types of wearable audio devices such as head, shoulder or body-worn acoustic devices (e.g., audio eyeglasses or other head-mounted audio devices) that include one more acoustic transducers to receive and/or produce sound, with or without contacting the ears of a user. It should be noted that although specific implementations of wearable audio systems primarily serving the purpose of acoustically outputting audio are presented with some degree of detail, such presentations of specific implementations are intended to facilitate understanding through provisions of examples and should not be taken as limiting either the scope of disclosure or the scope of claim coverage.

FIG. 1 illustrates wearable audio system 10 that includes first active portion 20 and second active portion 40. In an example portions 20 and 40 are functionally identical, although they do not need to be. In the proper use position active portion 20 is on one side of the mid-sagittal plane (e.g., on or near one ear) and the second active portion is on the other side of the mid-sagittal plane (e.g., on or near the other ear). In an example first active portion 20 includes a first off-ear headphone that comprises an audio driver 22 that is configured to output sound proximate but not in a first ear of the user, and second active portion 40 includes a second off-ear headphone that comprises a microphone 44 and an audio driver 42 that is configured to output sound proximate but not in a second ear of the user. In an example a processor (e.g., processor 46) is used to estimate from the microphone output whether the off-ear headphones are in their use positions, with one proximate or on one ear of the user and the other proximate or on the other ear of the user.

First active portion 20 includes audio driver 22 that receives audio signals from processor 26. Input audio signals are received by communications module 28, which can be enabled to receive signals wirelessly or via a wire, as is known in the field. Received signals are passed to processor 26. Other hardware that is typically included in a headphone (such as amplifiers and filters) is not depicted, simply for the sake of clarity. In an example active portion 20 further includes microphone 24 that provides received audio signals to processor 26. Inertial measurement unit (IMU) 30 is optional, and a use of it is explained below. Proximity sensor 32 is also optional, and a use of it is explained below. Power source 34 (which is typically a battery power source) supplies power to all components that require power.

Second active portion 40 includes audio driver 42 that receives audio signals from processor 46. Input audio signals are received by communications module 48, which can be enabled to receive signals wirelessly or via a wire, as is known in the field. Received signals are passed to processor 46. Other hardware that is typically included in a headphone (such as amplifiers and filters) is not depicted, simply for the sake of clarity. In an example active portion 40 further includes microphone 44 that provides received audio signals to processor 46. IMU 50 is optional, and a use of it is explained below. Proximity sensor 52 is also optional, and a use of it is explained below. Power source 54 (which is typically a battery power source) supplies power to all components that require power.

In some examples active portions 20 and 40 of wearable audio system 10 are separate left and right open audio devices, such as headphones that do not block the ear canal. In some examples active portions 20 and 40 of wearable audio system 10 are the audio portions of the two temple pieces of eyeglass headphones. More generally, active portions 20 and 40 are configured such that in their use positions where they are properly positioned on the user's body, one is on one side of the mid-sagittal plane and the other is on the other side of the mid-sagittal plane. Audio system 10 is configured to automatically estimate whether active portions 20 and 40 are in their proper use positions.

Figure 2:
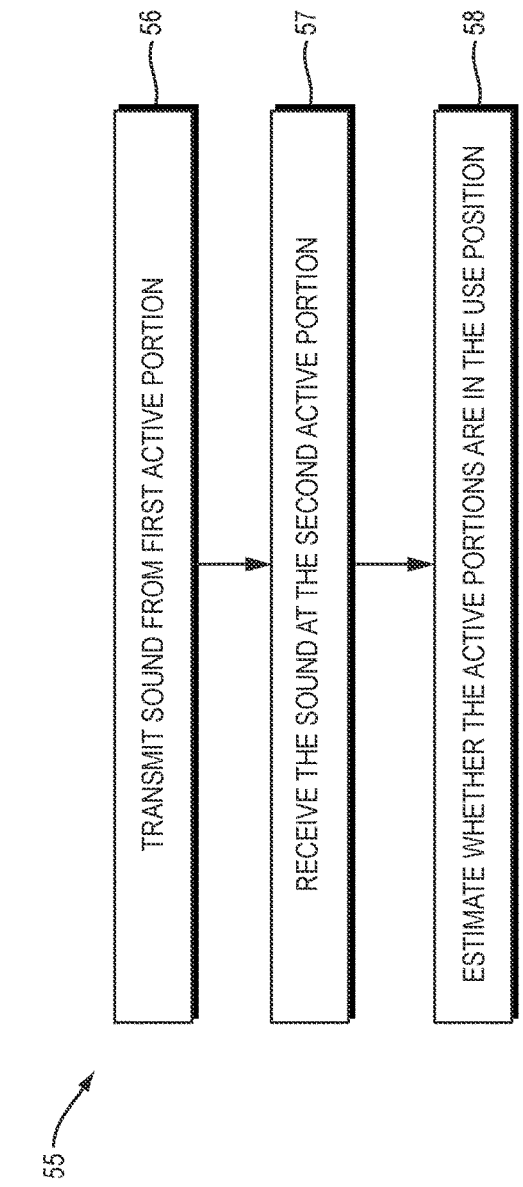
FIG. 2 is a flow chart illustrating an operation of the wearable audio system of FIG. 1.

FIG. 2 illustrates an exemplary method 55 for determining if the two active portions of a wearable audio system are in their proper use positions. In this example this estimation is determined by transmitting sound from the audio driver of one active portion, step 56, receiving sound at the other active portion, step 57, and estimating, from a determination of whether the sound was received at the other active portion, whether the two active portions are in their proper use positions, step 58. The sound can be audio that is played during normal use of the audio system (such as listening to music or a podcast), or the sound can be specific for the purpose of estimating if the active portions are in their use positions.

Figure 3:
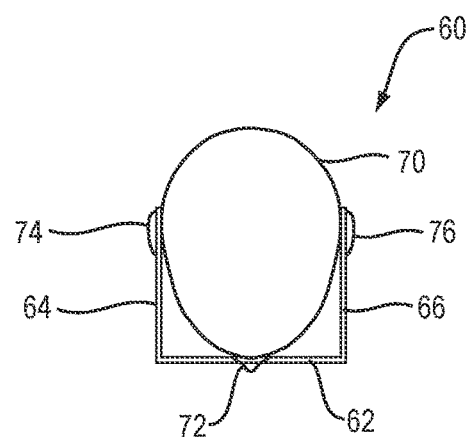
FIG. 3 is a top view of a person wearing eyeglass headphones with use position detection.

FIG. 3 is a top view of eyeglass headphones 60 in their proper use position on head 70. Bridge 62 lies across the face and over nose 72. Right temple piece 64 extends from bridge 62 and sits over right ear 74. Left temple piece 66 extends from bridge 62 and sits over left ear 76. In an example of the subject wearable audio system the two active portions of the wearable audio device are each part of one temple piece. In some examples each temple piece includes an audio driver that is configured to deliver sound from one or more openings in a temple piece, where an opening is close to but not in the ear canal opening of the ear over which the temple piece sits. For the audio systems and methods of this disclosure, at least one temple piece also carries a microphone that is able to receive sound outputted by the other temple piece. Eyeglass headphones are only one of many different types of open audio devices and off-ear headphones that can benefit from the use-position determination of this disclosure.

Figure 4:
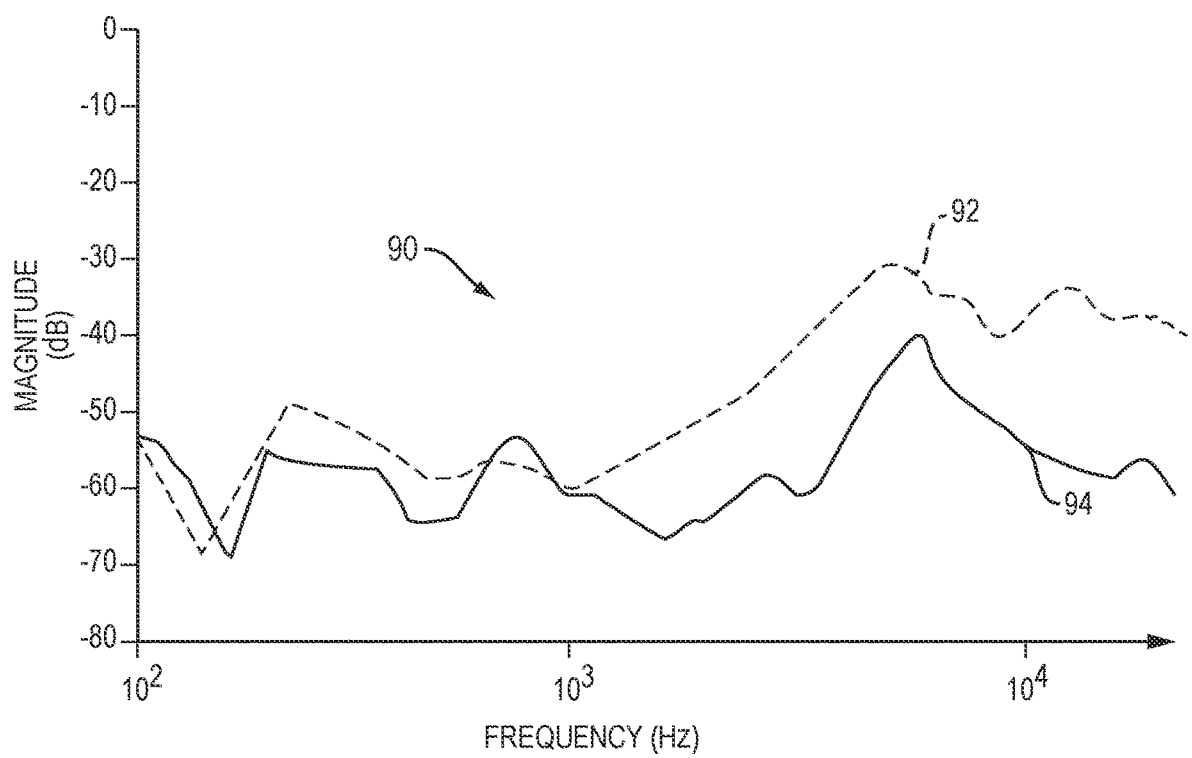
FIG. 4 illustrates the magnitude across a frequency range of the acoustic transfer function between a driver of one temple piece of the eyeglass headphones of FIG. 3 to a microphone on the other temple piece.

FIG. 4 illustrates the magnitude across a frequency range of the acoustic transfer function between a driver of one temple piece of the eyeglass headphones of FIG. 3 to a microphone on the other temple piece. In this example a processor is used to determine the acoustic transfer function between a driver in one temple piece and a microphone in the other temple piece. Processing can be accomplished by one or more processors that are part of the active portions of the wearable audio system, such as shown in FIG. 1. Additionally or alternatively processing can be done by processor(s) of related devices, such as by a smartphone that is in communication with an active portion and/or cloud-based processing when the wearable audio system or a smartphone running an app is configured to communicate with the cloud. In FIG. 4 the transfer function (in dB) across frequencies from about 100 Hz to about 10,000 Hz is plotted. Plot line 92 (the dashed line) illustrates the transfer function when eyeglass headphones such as depicted in FIG. 3 are off the head (e.g., with the temple pieces extended as depicted in FIG. 3 but sitting on a table). Plot line 94 (the solid line) illustrates the transfer function when the same eyeglass headphones are on the head in the proper use position, as depicted in FIG. 3. As can be seen, above about 1000 Hz the transfer function drops substantially when the eyeglass headphones are on the head, because the head attenuates higher frequency sound. With a semi-continuous transfer function estimate, at one or several frequencies, the system can classify the eyeglass headphones (and active portions of other types of wearable audio devices) as either in place or not (e.g., on or off the ears, on or off of the head, or on or off of the shoulders or torso). A threshold transfer function at a single frequency (e.g., a threshold of about −50 dB at 10,000 Hz) can be used. Frequency-dependent bounds of multiple frequencies could also be used, which may provide multiple data points that can be compared and thus may help with the reliability of the on/off determination. Long-term averaging of results can be used to help avoid false positives or negatives.

Since higher frequencies are attenuated by the head, for active portions of a wearable audio system that are configured to be carried on opposite sides of the head high frequencies can be used as the test sounds for purposes of determining if the active portions are in their proper use positions. In an example the transmitted sound is in the ultrasonic range so that it won't be heard by the user and so does not interfere with normal use of the wearable audio system. Sounds can be transmitted continuously or intermittently. Intermittent sound transmission will use less battery power, but the sound should be transmitted often enough to be useful as a means to determine whether the audio system is being worn or not. Pulses at discrete frequencies and at known time intervals can be used, and Fourier transforms can be performed on the received sound for the transfer function estimates. An efficient real-time implementation could leverage the well-known Goertzel algorithm, which is lean enough to run in the typical processors used in eyeglass headphones and other open audio devices and off-ear headphones that run off battery power.

The determination of whether the system is being worn or not can be used in any desired manner. For example, the audio system could be configured to automatically enter/exit a standby mode, to extend battery life. Music could automatically pause when the audio system is taken off, and resume when the system is put back on. Telephony control could automatically be transferred from a smartphone to the audio system when the system is donned, and transferred back to the phone when the system was doffed. Active noise reduction technology could automatically be enabled when the system was donned and disabled when the system was doffed. The gain of the system (e.g., when the system comprises a hearing assist product) could automatically decrease when the system is taken off and then increase back to normal when the system is put on; this could mitigate howling feedback instabilities that sometimes occur when hearing assistance products are donned and doffed.

In some examples one or more of an orientation sensor and a proximity sensor can be used to make the determination of whether or not the active portions of the wearable audio device are in their proper use positions, or to assist in that determination. IMUs 30 and 50, FIG. 1, can be used as orientation sensors, e.g., by using one or more accelerometers to determine the orientation relative to the Earth's gravitational field. As an example, for eyeglass headphones the temple pieces are generally horizontal when the eyeglass headphones are worn. In an example the orientation can be used as a threshold for operating the received sound based use-position determination described above. Or, the orientation sensing can be used as a check on the sound-based determination, or as a backup in case there is a problem with the sound-based determination. Proximity sensors 32 and 52, FIG. 1, can be used in a similar manner. In an example a proximity sensor such as an infrared sensor or a conductivity sensor can be used to determine when an active portion of the wearable audio system is near or on the skin or the head. Such sensors can be used as a threshold, as a check, or as a backup to the sound-based determination, as described for the orientation sensor. In an example an accelerometer (e.g., that is part of an IMU) and that is in contact with the user can be used as a vibration sensor. Some accelerometers operate in a frequency range above 1000 Hz and so can be used in place of or as a backup to a microphone for sensing sound used in determining whether the active portions of the wearable audio system are in their proper use positions.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the personal audio devices, systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A method, comprising:
transmitting sound from a first active portion of a wearable audio system;
receiving the transmitted sound at a second active portion of the wearable audio system; and
estimating from the received sound whether the first active portion of the wearable audio system is in a use position carried on a user's body on a first side of the mid-sagittal plane and the second active portion of the wearable audio system is in a use position carried on the user's body on a second side of the mid-sagittal plane.

2. The method of claim 1, wherein the first and second active portions of the wearable audio system are open audio devices.

3. The method of claim 2, wherein the first and second open audio devices each comprise an off-ear headphone that comprises an audio driver that is configured to output sound proximate but not in an ear of the user.

4. The method of claim 1, wherein the first active portion of the wearable audio system is part of a first temple piece of eyeglass headphones and the second active portion of the wearable audio system is part of a second temple piece of the eyeglass headphones.

5. The method of claim 1, wherein the first and second active portions of the wearable audio system each comprise an audio driver and a microphone.

6. The method of claim 1, wherein the first active portion of the wearable audio system comprises an audio driver and the second active portion of the wearable audio system comprises a microphone.

7. The method of claim 1, wherein estimating from the received sound whether the first active portion of the wearable audio system is in a use position carried on a user's body on a first side of the mid-sagittal plane and the second active portion of the wearable audio system is in a use position carried on a user's body on a second side of the mid-sagittal plane comprises detecting whether the transmitted sound was received at the second active portion of the wearable audio system.

8. The method of claim 7, wherein estimating from the received sound whether the first active portion of the wearable audio system is in a use position carried on a user's body on a first side of the mid-sagittal plane and the second active portion of the wearable audio system is in a use position carried on a user's body on a second side of the mid-sagittal plane further comprises determining a level of the received sound.

9. The method of claim 8, wherein determining a level of the received sound comprises determining whether the level of received sound is less than a threshold level.

10. The method of claim 9, wherein the threshold level comprises a level of received sound when neither of the first and second active portions of the wearable audio system are in the use position.

11. The method of claim 8, wherein determining a level of the received sound comprises determining an acoustic transfer function between an audio driver of the first active portion of the wearable audio system and a microphone of the second active portion of the wearable audio system.

12. The method of claim 11, wherein a level of the transfer function is determined for at least one frequency above a threshold frequency.

13. The method of claim 12, wherein the threshold frequency is 1 kHz.

14. The method of claim 1, wherein the transmitted sound is in an ultrasonic range.

15. The method of claim 14, wherein estimating from the received sound whether the first active portion of the wearable audio system is in a use position carried on a user's body on a first side of the mid-sagittal plane and the second active portion of the wearable audio system is in a use position carried on a user's body on a second side of the mid-sagittal plane comprises performing discrete Fourier transforms on received ultrasonic sounds.

16. The method of claim 1, further comprising using an orientation sensor to determine if the first and second active portions of the wearable audio system are in the use position.

17. The method of claim 1, further comprising using a proximity sensor to determine if the first and second active portions of the wearable audio system are in the use position.

18. A method, comprising:
transmitting sound from a first temple piece of eyeglass headphones, wherein the first temple piece comprises an audio driver that is configured to output sound proximate but not in an ear of the user;
receiving the transmitted sound at a microphone of a second temple piece of eyeglass headphones, wherein the second temple piece comprises a microphone, and an audio driver that is configured to output sound proximate but not in an ear of the user; and
determining a level of the received sound, to determine whether the eyeglass headphones are in a use position with the first temple piece proximate a first ear of the user and the second temple piece proximate a second ear of the user.

19. A wearable audio system, comprising:
a first off-ear headphone that comprises a first audio driver that is configured to output sound proximate but not in a first ear of the user;
a second off-ear headphone that comprises a second audio driver that is configured to output sound proximate but not in a second ear of the user, and a microphone having an output; and
a processor that is configured to estimate from the microphone output whether the first off-ear headphone is in a use position proximate or on the first ear of the user and the second off-ear headphone is in a use position proximate or on the second ear of the user.

20. The wearable audio system of claim 19, wherein estimating from the microphone output whether the first off-ear headphone is in a use position proximate or on the first ear of the user and the second off-ear headphone is in a use position proximate or on the second ear of the user comprises comparing a level of the microphone output to a threshold level determined when neither of the first and second off-ear headphones are in the use position.

* * * * *